3,794,543
APPARATUS FOR TRANSFERRING AND AFFIXING ARTICLES TO EITHER ONE OF TWO ANGULARLY DISPOSED SURFACES

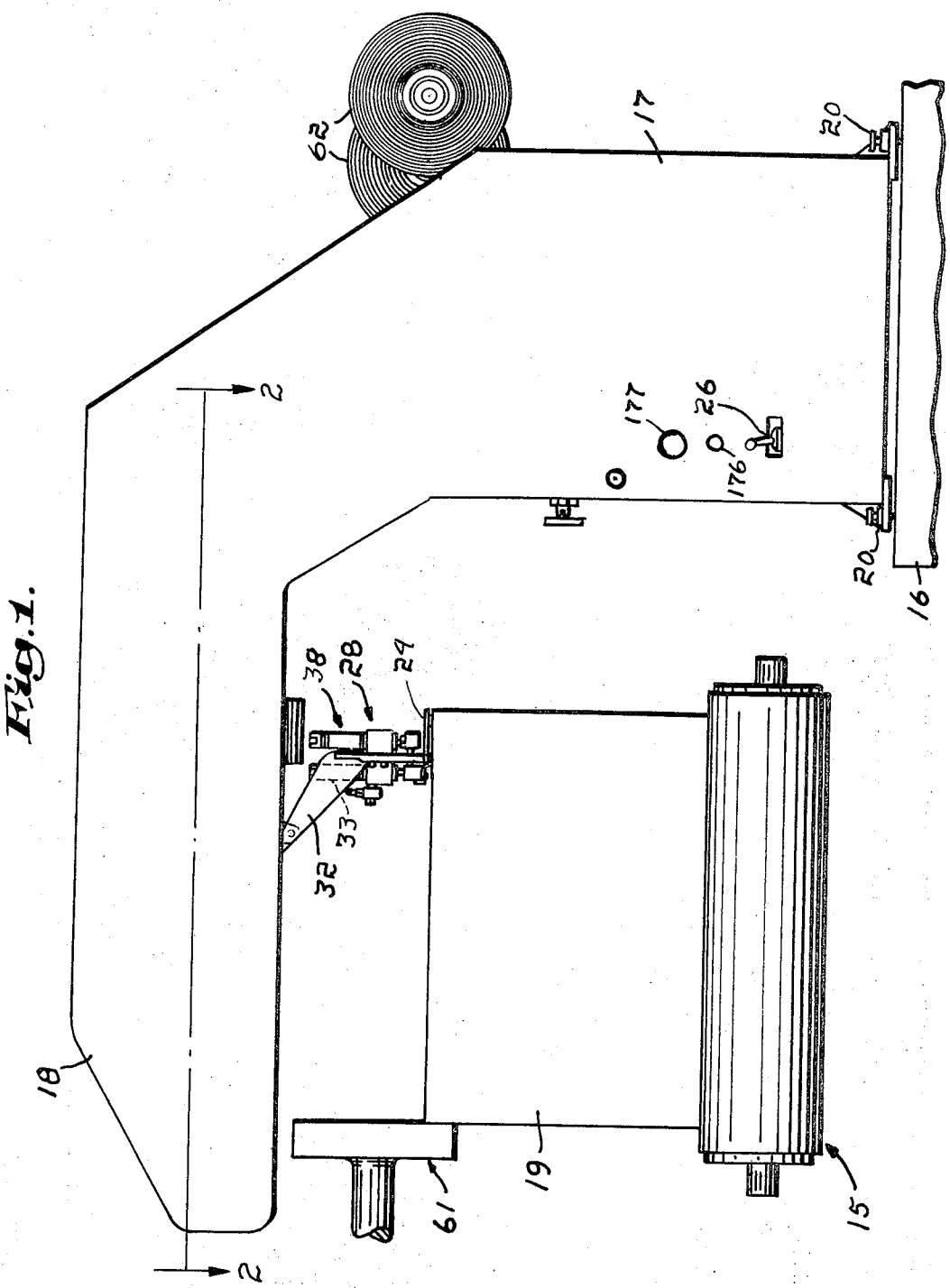

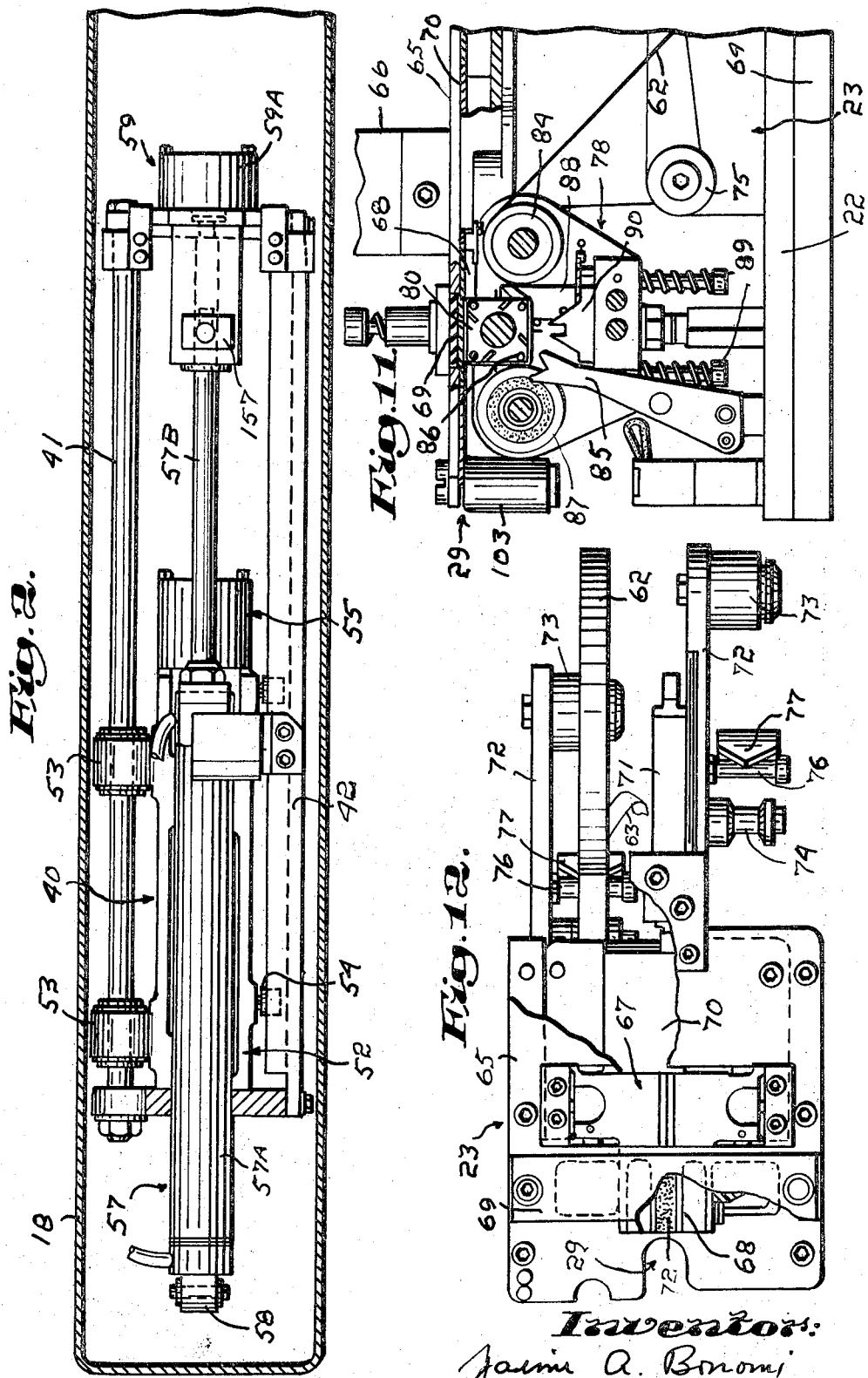

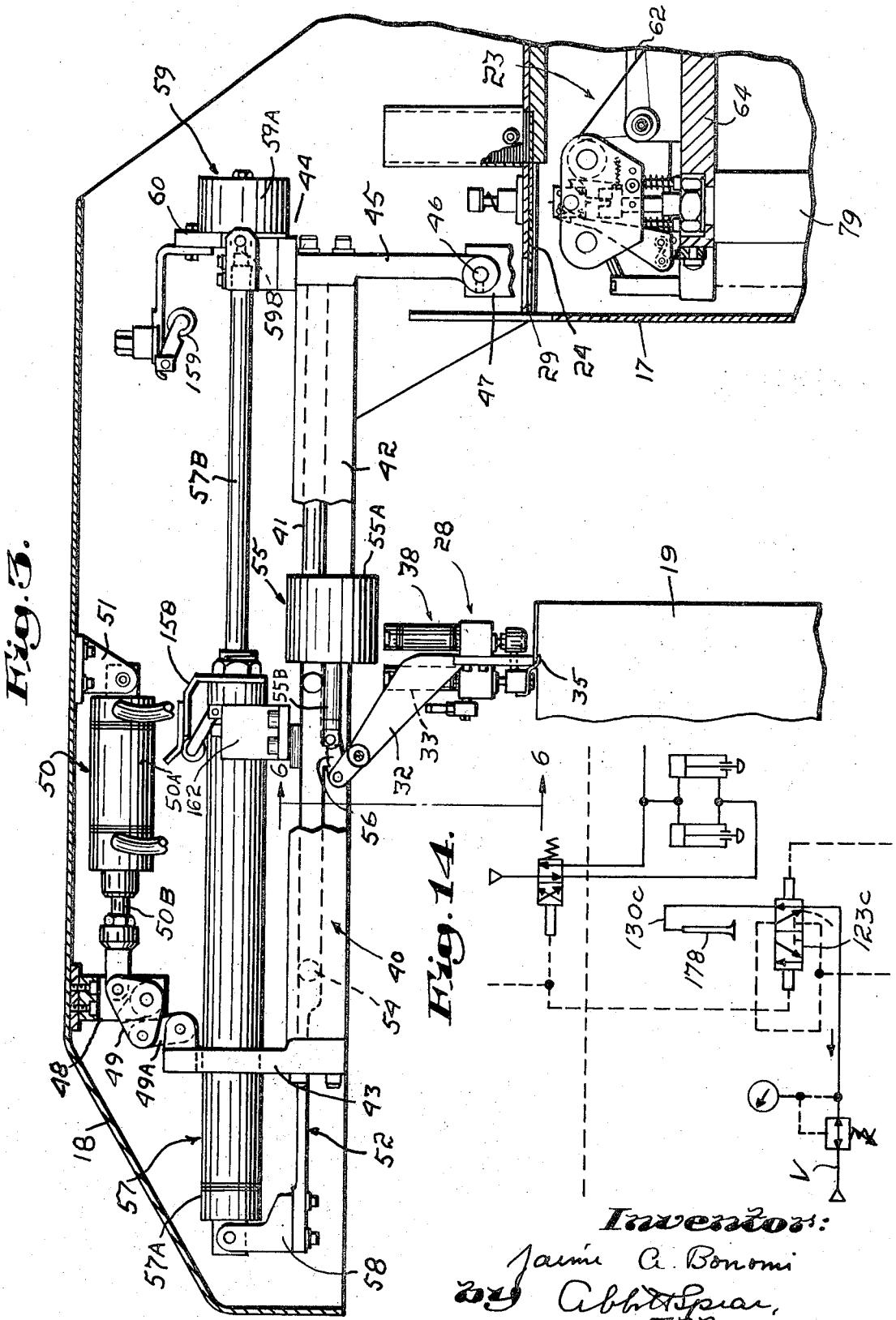

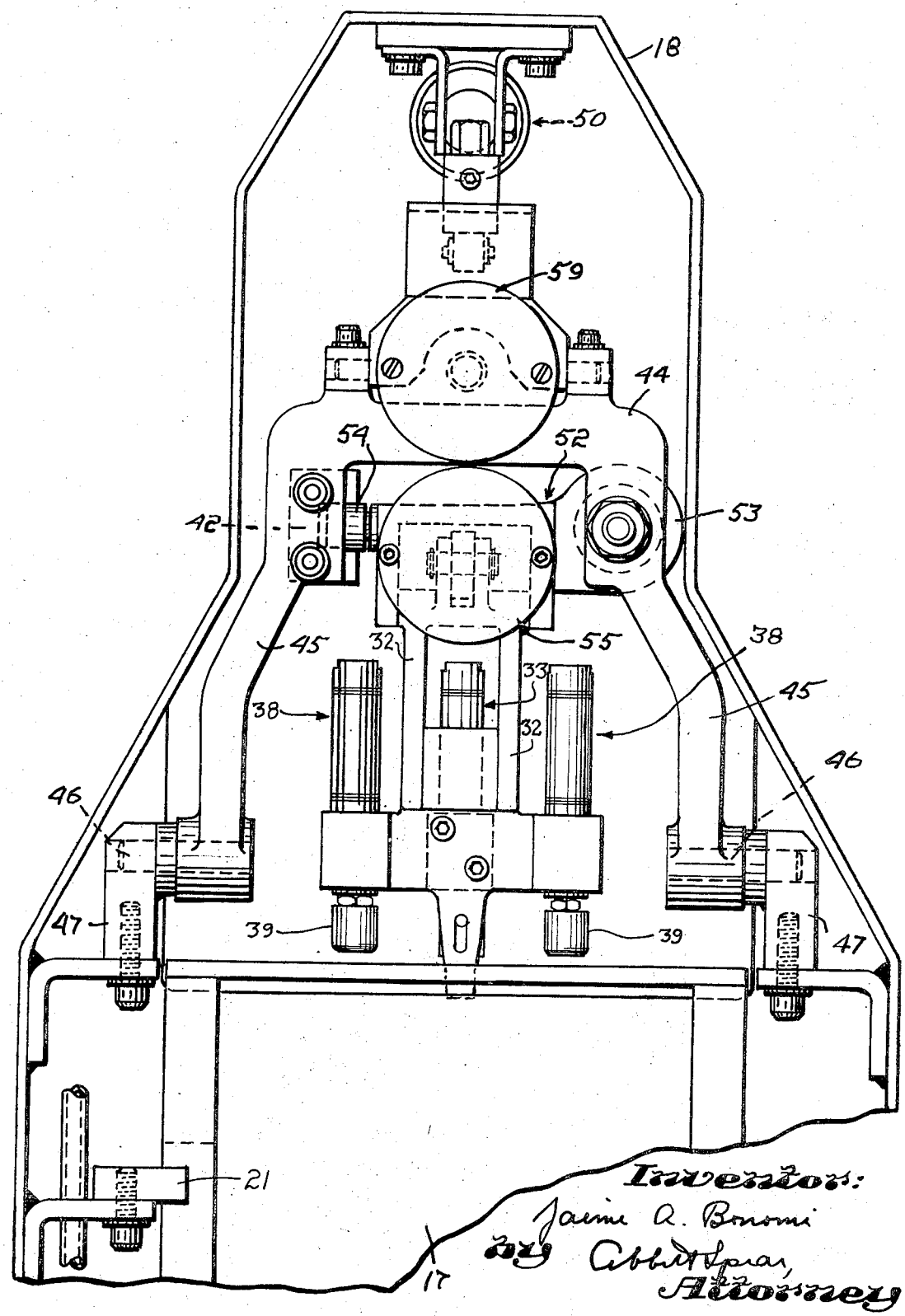

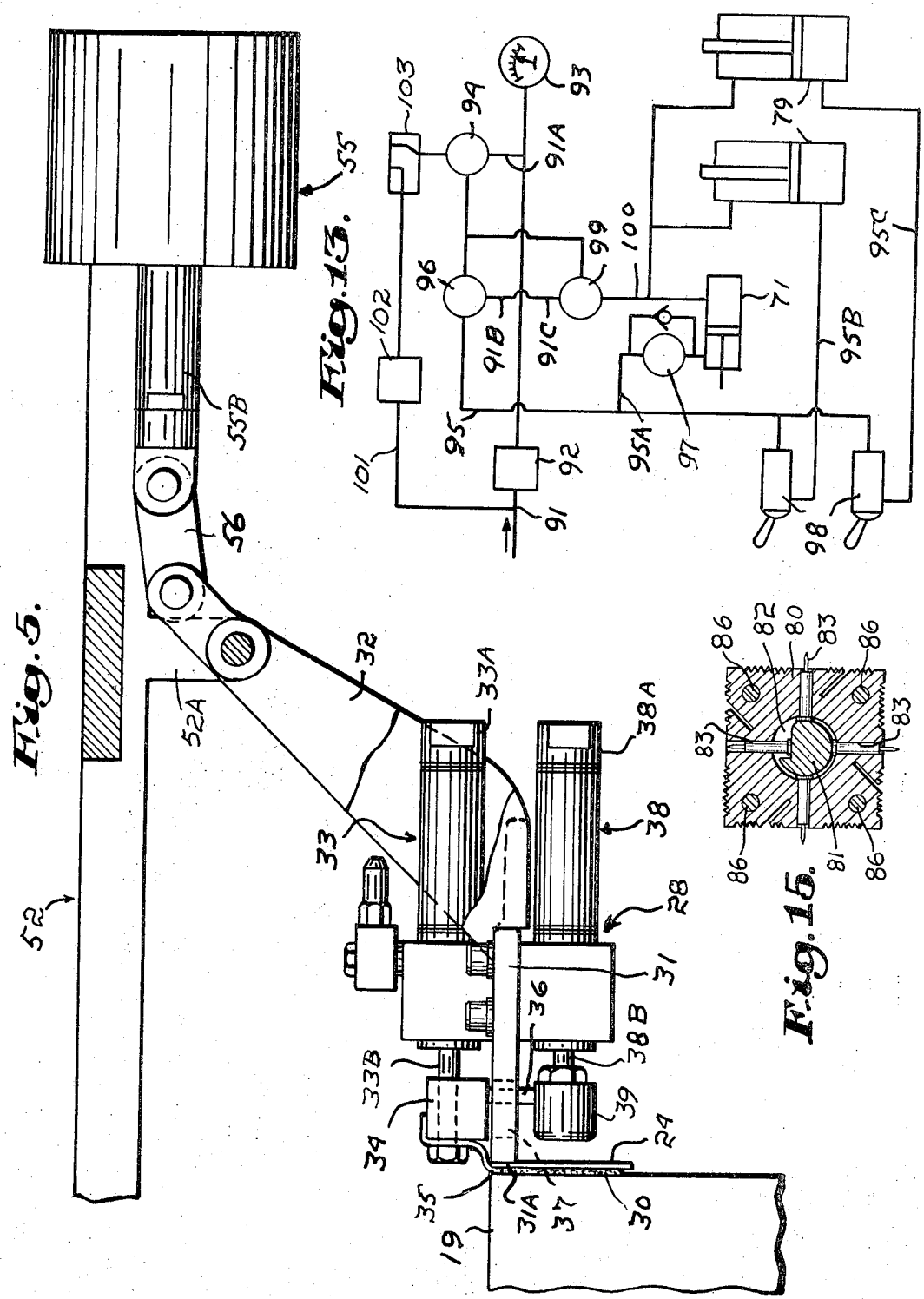

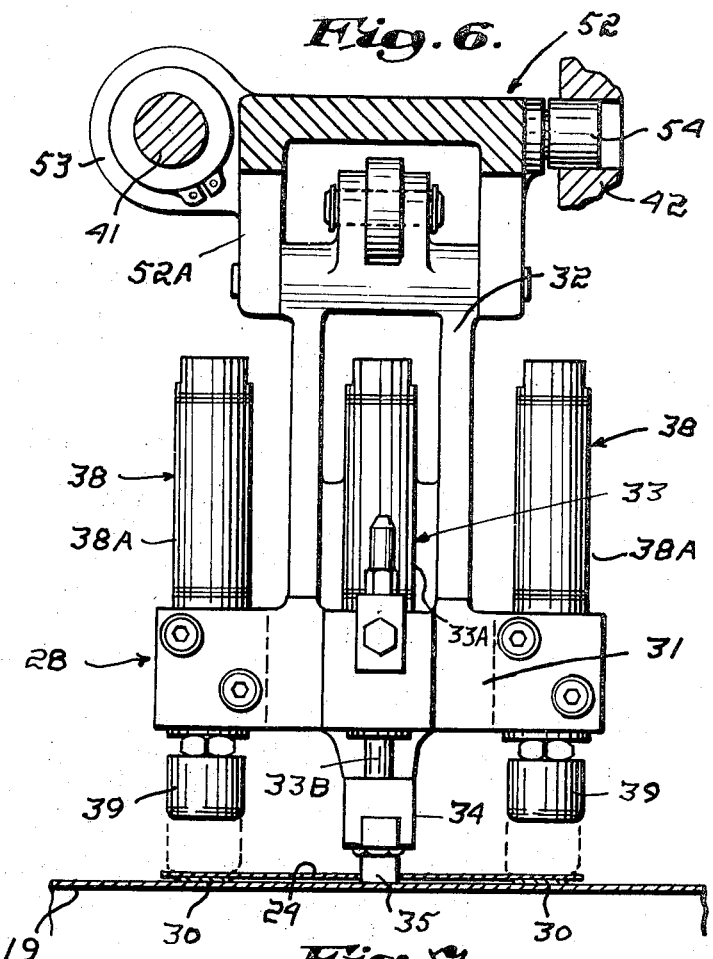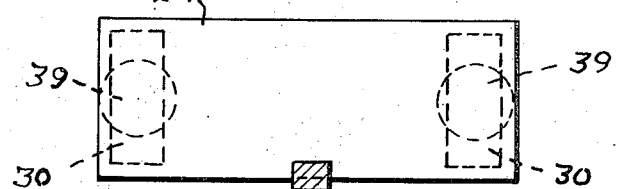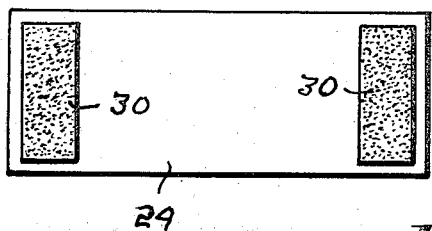

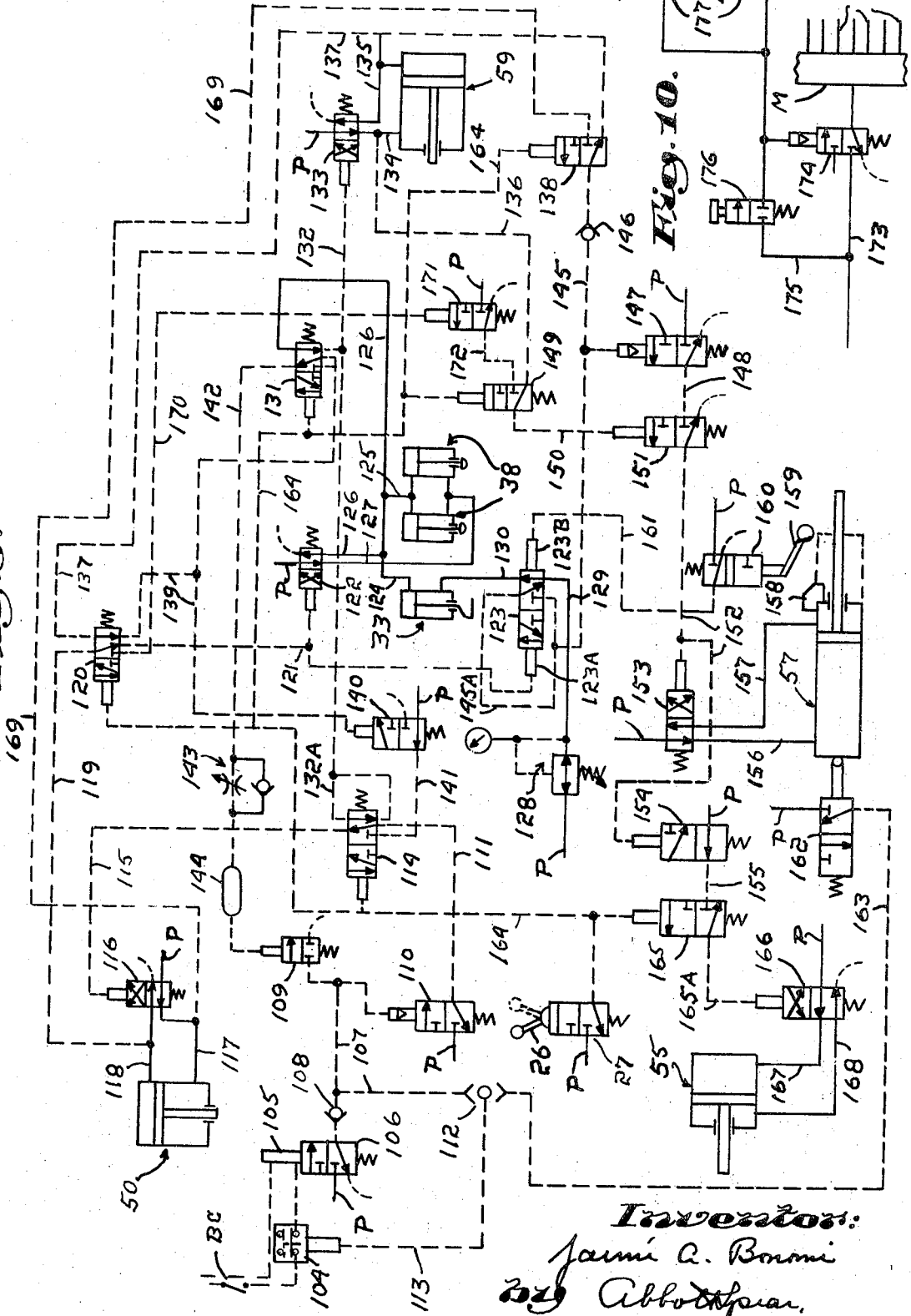

Jaime A. Bonomi, Waltham, Mass., assignor to Tapeler Corporation, Newton, Mass.
Filed Dec. 3, 1971, Ser. No. 204,542
Int. Cl. B65c 9/08
U.S. Cl. 156—566        25 Claims

ABSTRACT OF THE DISCLOSURE

Apparatus is disclosed for use in conjunction with dispensers providing, at a station, an article having adhesive on its undersurface in condition to anchor the article to the selected one of two angularly disposed surfaces. The apparatus has a head, adjustable for article applications to either surface and provided with means operable to pick up the article at the station and release it when positioned against the selected surface. The apparatus has means, disclosed as pneumatically operated, to move the head to and from the station into a position proximate to the selected surface, operate the pick-up means at the station, press the article against the selected surface and release it and return the head to pick up another article. In practice, the starting point of the cycle, triggered by the presentation of the selected surface in a predetermined position, is characterized by the head, with an article held thereby, being proximate to the selected surface.

BACKGROUND OF THE INVENTION

The term "article" as used herein means any article having adhesive thereon in condition to affix it to an object to which it is transferred and against which it is pressed. Cards, carrying, attaching or securing strips, labels and inventory tickets are representative examples. The apparatus herein disclosed is discussed primarily with reference to its use with inventory tickets.

It has long been the practice to affix inventory tickets, sometimes referred to as tags, to merchandise or to their containers as by pins and staples, special tickets releasably caught by fabric articles, and by tickets provided with an adhesive. Apparatus has been designed for use in the attachment of tickets by all such means.

For a variety of reasons, the adhesive attachment of tickets is preferred in most situations and one type of apparatus utilizes tickets to which a heat softened adhesive is applied. The advent of pressure-sensitive, double-faced, adhesive tapes has resulted in proposals for their use for this purpose, see for example U.S. Pat. No. 3,437,214. As far as I am aware, however, the problems of automatically transferring articles having adhesive in condition for use and applying them to a surface of an object have not hitherto been successfully solved.

SUMMARY OF THE PRESENT INVENTION

The present invention has for its general objective the provision of apparatus for picking up an article at a station to which the articles are successively delivered in condition for application to a surface of an object and then to affix that article thereto when the object is in a predetermined position. The articles are preferably, but not necessarily, ones having double-faced, pressure-sensitive adhesive tape sections secured to their undersurface and, in the disclosed embodiment having such tape section or sections confined to a portion or portions of their undersurfaces so that an adhesive-free area is provided that may be engaged by a clamping jaw. Where the adhesive covers the entire undersurface of an article or where it is in an area that would be engaged by a mechanical pick-up, the use of a suction pick-up is preferred.

The apparatus includes a head provided with means operable in the alternative to pick up an article at the station and hold it or to release it. The head is supported by means reciprocable between a position in which the pick-up means is at the station and a position in which the held article is seated against the selected surface of the object. The head is also provided with means movable into and out of pressing contact with a held article. The above referred-to means are under the control of means operable in response to the presence of an object in said predetermined position to effect such reciprocation, operate the pick-up means to seize an article at the station and to release it when seated against the surface, and to bring the article pressing means into and out of pressing contact with the article during its release.

Another objective attained by the invention is to enable an article to be applied in either one of two selected positions, one to the top surface of an object and the other to a side thereof, an objective attained by providing means that may be set to change the position of the head after the pick-up of an article and before its application to the selected surface with the head always being in the same position at the pick-up station.

Another objective of the invention is to ensure that a transferred article is securely affixed to the selected surface, an objective attained by providing the head with at least one and preferably two article pressing members, one on each side of the pick-up means, and brought from an inoperative position into pressing contact with end portions of the article when the head seats the article against the surface of the object, the pressing contact or contacts being in areas under which there is adhesive.

Another objective of the invention is to provide that the head has three positions in effecting article transfers, the first, at the station, the second closely adjacent the position occupied by the surface at the predetermined position of the object and in the third, with the article pressed against the surface. The head reciprocating means includes a carriage supported by a carrier that is mounted so that the carriage may be raised and lowered and the carriage is movable into three positions along the carrier.

It is preferred that the starting point of each cycle be with an article held by the head and the head in its second position. In top applications, the carriage is lowered to provide the third position. In side applications, the head is brought into its third position relative to the carrier to provide the third position of the head with the carrier lowered.

Another objective of the invention is to provide that the pick-up means is a mechanical clamp including a clamping arm extending under the article and operable to clamp it against a fixed clamping surface of the head and to provide for its withdrawal from under the article, while held against the selected surface by the article-pressing means.

In the application of articles to the tops of boxes with a head provided with a clamping arm, the clamping arm is disengaged from the affixed article by movement of the carrier from its second to its third position. In the application of articles to the side of boxes, the disengagement of the clamping arm from the article is effected by raising the carrier.

The preferred construction includes air-operated, piston-cylinder units for effecting such movements and for positioning the head for side and top applications and the circuitry is such that the same components may be adapted for either mode of operation by manually setting a single valve.

THE PREFERRED EMBODIMENT

In the accompanying drawings, there is shown the preferred embodiment of the invention in which FIG. 1 is a side view of the apparatus;

FIG. 2 is a section taken approximately along the lines 2—2 of FIG. 1;

FIG. 3 is a partly sectioned side view of the supporting arm;

FIG. 4 is a view of the apparatus as seen from its right hand end with the dispenser removed;

FIG. 5 is a fragmentary side view with the applier positioned to apply a ticket to the side of a box;

FIG. 6 is a section taken approximately along the indicated lines 6—6 of FIG. 3;

FIG. 7 is a view showing the upper surface of a ticket and the area in which it is held and the area where affixing pressures are applied;

FIG. 8 is a view showing the undersurface of the ticket;

FIG. 9 is a schematic view of the circuitry by which the various piston-cylinder units are operated and the control circuitry therefor;

FIG. 10 is a like view of the operator controls;

FIG. 11 is a fragmentary section of the dispenser with the head in its elevated position and the ticket advancing means in its retracted position;

FIG. 12 is a top plan view of the dispenser with its top plate partly broken away;

FIG. 13 is a schematic view of the operating circuitry of the dispenser;

FIG. 14 is a fragmentary view of a modification of the circuitry of the apparatus with the ticket pick-up being suction operated;

FIG. 15 is a section, on an increase in scale, through one of the dispenser feed blocks taken at right angles to its axis.

The apparatus illustrated by the drawings is typically mounted at one side of a conveyor 15 on a support 16 that is desirably vertically adjustable relative to the conveyor. The apparatus comprises a housing including a base 17 on the support 16 and an arm 18 overlying the conveyor 15 by a distance such that boxes 19 may pass freely thereunder. The housing is provided with vertically adjustable feet 20 enabling precise adjustments to be made in the relationship between the apparatus and the boxes being conveyed by it.

The base 17 of the housing is open at its rear end and includes a pair of transversely aligned guides 21 providing a slideway receiving the marginal shoulders 22 of a dispenser, generally indicated at 23, for tickets 24. While the ticket dispenser 23 may be of any type that presents a ticket 24 in condition to be applied to a box, that shown in the recently filed co-pending application of Robert F. Davis entitled "Apparatus For Preparing Inventory Tickets and Labels For Use by Applying Thereto Sections of Double-Faced, Pressure-Sensitive Adhesive Tape," owned by applicant's assignee, is preferred and is subsequently detailed to enable its operation in conjunction with ticket transferring apparatus in accordance with the invention to be understood.

The apparatus is adapted to so operate as to apply tickets to the tops of boxes 19, see FIGS. 1 and 3, or to the sides thereof, see FIG. 5, with the change from one basis of operation to the other being effected simply by shifting the control arm 26 of a valve 27, shown only in FIG. 9, into the appropriate position.

The apparatus may be most conveniently explained and its operation understood by first detailing its ticket transferring and affixing head, generally indicated at 28 and its relation to a ticket 24 which is delivered by the dispenser 23 into a predetermined position at a station generally indicated at 29. Each ticket 24, see FIGS. 7 and 8, has, on its undersurface, an adhesive section 30 adjacent each end thereof. The head 28, see FIGS. 5 and 6, consists of a mount 31 having an angularly disposed supporting arm 32. The cylinder 33A of an air-operated double-acting, piston-cylinder unit 33 is secured to the front of the mount 31 centrally thereof. A block 34 is fixed on the end of the stem 33B of the unit 33 and has a clamping arm 35 extending under and beyond the bottom edge 31A of the mount 31 which edge functions as a fixed, ticket clamping member. When air is delivered to the cylinder 33A to retract the stem 33B, the arm 35 is brought into its ticket-clamping relationship to the bottom edge 31A with the picked-up ticket 24 being released when air is delivered to the cylinder 33A to advance its stem 33B. The block 34 is provided with a pin 36 entrant of the guide slot 37 with which the mount 31 is provided to prevent the turning of the stem 33B.

The cylinders 38A of a pair of air-operated, double-acting, piston-cylinder units generally indicated at 38, are mounted on the other side of the mount 31, one on each side of the unit 32 and in a position such that pressing members in the form of caps 39 on the ends of the stem 38B of the units 38 engage and press the ticket against the surface when air is delivered to the cylinders 38A to advance the stems 38B of the upper face of the held ticket, directly over the adhesive sections 30 until the delivery of air to the cylinders 38A retracts the stems 38B.

In either basis of operating the apparatus, the normal or starting condition of the head 28 is with the unit 32 operated to pick up and hold a ticket 24 and with the units 32 operative to hold the pressing members 33 out of contact with the held ticket.

The arm 18 is a downwardly opening housing and, as may best be seen in FIGS. 3 and 4, there is a carrier, generally indicated at 40, consisting of a lengthwise rod 41 and a parallel channel 42 opening towards the rod 41. The rod and channel are connected at their front ends in laterally spaced relation by a hanger 43 and at their rear ends by a support 44 having spaced legs 45 extending downwardly into the base 17 and there pivotally connected as at 46 to fixed mounts 47. A bracket 48 adjacent the front end of the arm 18 pivotally supports a link 49 and a connecting link 49A is pivotally connected thereto and to the hanger 43. An air operated, double-acting, piston-cylinder unit 50 has its cylinder 50A pivotally connected within the arm 18, to a bracket 51 located rearwardly of the bracket 48 and its stem 50B pivotally connected to the link 49. As will be apparent from the drawings, when air is delivered to the cylinder 50A to retract the stem 50B, the carrier 40 is swung upwardly from its lowered position, that shown in FIG. 3, into its raised position. The second or raised position is normal for box top applications and the first or lowered position is normal for box side applications. In the first basis of operation, the carrier 40 is swung downwardly to push the head 28 against the top of the box. In the case of box side applications, the carrier is raised in order to so back the head 28 away from an affixed ticket as to free the clamping arm 35 for engagement therewtih.

A carriage, generally indicated at 52, is provided, on one side, with a pair of longitudinally spaced bosses 53 slidably receiving the rod 41 and, on its other side, with a pair of rollers 54 within the supporting channel 42. The carriage 52 has a depending yoke 52A to which the arm 32 of the ticket transferring and affixing head 28 is pivotally connected. The cylinders 55A of an air-operated, double-acting, piston-cylinder generally indicated at 55, is also supported by the carriage 52 and a link 56 is pivotally connected to the free end of the arm 32 and to the stem 55B of the unit 55. When air is admitted to the cylinder 55A to advance its stem 55B, the arm 32 is swung counter clockwise as viewed in FIG. 5 through an arc of 90° with the head 28 now positioned for affixing tickets 24 to the side of a box 19. When air is admitted to the cylinder 55A to retract its stem 55B, the arm 32 is swung in the opposite direction into its position shown in FIG. 3 in which it is operative to apply tickets 24 to the tops of boxes.

The carriage 52 is reciprocable along the carrier between first, second, and third positions. The travel of the carriage 52 between the first and second positions is effected by an air-operated, double-acting, piston-cylinder unit, generally indicated at 57, the cylinder 57A of which is pivotally connected to a mount 58 at the front end of the carriage 52. The stem 57B of the unit 57 is secured to the stem 59B of an air-operated, double-acting, piston-cylinder unit, generally indicated at 59 whose cylinder 59A is secured to a mount 60 connected to the support 44. When air is delivered to the cylinder 57A in a manner advancing its stem, the clinder 57A and accordingly the carriage 52 is moved forwardly from its first position in which the head 28 is at the pick-up station 29 and a second position adjacent a box. When air is admitted to the cylinder 57A in a manner normally retracting its stem 57B, the cylinder 57A returns to place the carriage 52 in its first position. When air is admitted into the cylinder 59A to advance its stem 59B, the unit 57 and the carriage are advanced a short distance into the third position thereof for the purpose of backing the head 28 away from an affixed ticket 24 to free the clamping arm 35 for engagement therewith, in the case of box top application and for the purpose of pressing the head 28 into engagement with the side of a box in the case of the application of a ticket to the side thereof. It should be noted that in that mode of operation, a backer 61 is usually mounted adjacent the conveyor 15 for engagement with the boxes as the tickets 24 are applied thereto.

In the raised position of the carrier 40 and with the head 28 in the position shown in FIGS. 1 and 3, and with the clamping jaw 35 in its open position, movement of the carriage 52 from its second position rearwardly into its first position places the head 28 in a pick-up position at the station 29 of the ticket dispenser 23. When the carriage 52 has been returned to its second position, a ticket 24 is held by the head 28 close to the box, either the top or the side depending on the setting of the valve 27, and is then pushed into contact therewith with the members 39 pressing the ticket in place to affix it. The pressing members 29 are then withdrawn from contact with the affixed ticket 24 after the clamping jaw 35 is moved into its open position. After the head is backed off and raised, in the case of box top applications, or backed off as a consequence of being raised, in the case of box side applications, the head returns into its second position and the cycle may be repeated. It is preferred that the starting point of each cycle be with the head in its second position with a picked-up ticket ready to be transferred.

The ticket dispenser 23, in order that each ticket may have an adhesive section 30 at each end, is provided with two means for forming such sections from rolls of pressure-sensitive, double-faced, adhesive tape 62. Such tapes commonly are provided with a liner 63. As both means are identical, only one will be detailed.

The dispenser includes a bottom support 64 provided with the shoulders 22 and a top plate 65 on which is seated a ticket magazine 66 with the bottom ticket seated within a slideway 67 whose bed has a channelled rib 68 extending forwardly under a spring-backed member 69 to the pick-up station 29. A pusher plate 70, slidable in the slideway 67 is connected to the stem of a piston-cylinder unit 71 mounted in the top plate 65 and is reciprocated thereby between a position rearwardly of the magazine and a forward position in which it will have pushed the seated ticket forwardly to place it under the backing member 69. When a ticket is thus pushed forwardly, it pushes any ticket underlying the backing member into the pick-up station 29. The channelled rib 68 is provided with a resilient ticket snubber 72 operable to yieldably hold a ticket under the backing member 69 until thus pushed forward.

The bottom plate 64 has a pair of rearwardly extending arms 72, one for each of the two means of the dispenser for forming and applying the tape sections 30 to the tickets. Each arm 72 has a support 73 on which a roll of tape 62 is rotatably mounted. Each arm has guiding rolls 74 and 75 and an intermediate festoon roll 76 disposed so that the tape trained about it defines a sharp angle. Associated with the roll 76 is a stripper 77 for removing the tape liner 63.

Each of the tape section forming and applying means includes a generally indicated head 78 connected to the stem of a piston-cylinder unit 79 whose cylinder is attached to the bottom plate 64. Each head 78 has a square feed block 80, best seen in FIG. 15, rotatably supported by an axle 81 having a cam pocket 82 so located that tape anchoring pins 83 slidably held in each face of the feed block 80, are held outwardly to anchor the tape 62 except when, in the case of a block face disposed upwardly, the pins drop into the pocket 82 to free the tape. Before traversing the underface of the block 80, the tape is trained over a roller 84, see FIG. 11, rotatable only in a tape-unwinding direction. As the tape has an adhesive coat on both faces, the faces of the feed block are coated with polytetrafluoroethylene so that reliance must be placed on the pins 83 in ensuring the delivery of tape sections.

The bottom plate 64 has pivoted pawls 85 spring-biased into an operative position in which, when the heads are retracted, engage pins 86 with which each corner of the block 80 is provided, thus to turn the block 80 to pull tape from the appropriate tape roll and cut the tape by contact of a trailing corner of the feed block with a rotatable anvil 87 to provide a tape section. Each block 80 is held against retrograde rotation by a pin engaging spring latch 88.

When the heads are fully retracted, spring backed plungers 89 are operative to carry a pusher 90 towards the lowermost face of the block 80 to ensure that the tape is punctured and secured by pins 83.

When the units 79 are operated to advance the heads 78, they are carried into contact with and transfer their tape sections 30 to the undersurfaces of a ticket 24 underlying the backing member 69. When they are retracted, they pull tape 62 from the rolls and cut the next to-be-applied sections therefrom.

In practice, the dispenser is operated by the removal of a ticket from the station 29 in the following manner, see FIG. 13. Air from a source is delivered through a conduit 91 provided with a pressure regulating valve 92 and a gauge 93. The conduit 91 has branches 91A, 91B, and 91C with the branch 91A closed by a normally closed valve 94. The branch 91B is connected to a conduit 95 by a normally open valve 96, the conduit 95 having branches 95A, 95B, and 95C. The branch 95A is in communication with the unit 71 and is operative to provide that it is normally fully retracted with the delivered air bypassing the flow regulator 97. The branches 95B and 95C are each controlled by a manually operated valve 98 and each is in communication with an appropriate one of the units 80 to provide that their stems are normally fully extended. The valves 98 enable either of the tape section forming and applying means to be rendered inoperative. The branch 91C has a valve 99 normally positioned to connect the conduit 100 to relief. The conduit 100 is connected to the units 71 and 79.

A branch 101 from the air source includes a pressure regulating valve 102, a sensor 103 and the valve 94. The presence of a ticket at the sensor 103 shunts air to the valve 94 with air delivered thereto maintaining it closed. When no air is delivered to the valve 94 by the branch 101, the valve 94 is shifted and air from the conduit 91A now shifts the valves 96 and 99 to reverse the operation of the units 71 and 80 and the advance of the stem of the unit 71 is then retarded by the regulator 97.

It will thus be apparent that whenever a ticket 24 is removed from the station 29 it is immediately replaced by another ticket having one or more sections of the double-faced, pressure-sensitive tape fixed on its undersurface.

The operating and control circuits for effecting the operation of the various piston-cylinder units will now be detailed explaining more fully how the above summarized operating cycle is effected for both types of operation.

In FIG. 9, the pneumatic operating and control conduits are schematically shown. Each air supply is shown by a solid line leading to the appropriate valve and is identified by the reference letter P and is in communication with a manifold M, see FIG. 10. Each conduit that is used in operating the several piston-cylinder units is also represented by a solid line. The control conduits are represented by broken lines.

To simplify the description, reference is here made to the types of valves employed when two or more like valves are used. All the valves are commercially available. One type of valve is a three way valve normally closed by a spring and provided with a pilot by the introduction of air to which the valve may be set. For convenience, this type of valve is referred to as the "A" type.

Another type of valve of which several are used, is a four way valve having five ports and provided with a pilot for use in operating the valve against the opposition of a return spring. Such valves will be referred to as of the "B" type.

Two three-way valves are used that have a pilot for setting the valve against the action of a return spring but of a type in which the air pressure necessary to maintain the pilot operative is derived from the air passing through it. These valves are referred to as of the "C" type.

In addition, the operator control, see FIG. 10, uses two way valves that are opened against the action of a spring by a manually depressed pushbutton. Such valves are referred to as type "D" valves.

A normally open switch BC is located in the path of boxes travelling along the conveyor 15 to be closed by their engagement therewith when they are in such a position that a ticket 24 may be affixed thereto and when closed, an electric signal is delivered to the switch 104, which is normally closed and is pneumatically opened and when closed, the solenoid 105 is energized to open the normally closed valve 106 against the action of a spring to effect the delivery of air from a manifold conduit P to a conduit 107 through a check valve 108. The conduit 107 is in communication with a two way valve 109 of the type having a pilot operable to set the valve against the opposition of a spring and is normally positioned thereby to provide a dead end and the pilot of a valve 110 of the "C" type and when air is delivered thereto connecting a conduit 111 to a manifold conduit P. The conduit 107 is also in communication with a check valve 112. Air delivered through the conduit 107 opens the check valve 112 and delivers air through the conduit 113 to effect the opening of the switch 104 with the valve 106 then closing. Because the valve 110 is of the "C" type, the pressure on its pilot is maintained until the valve 109 is connected to relief.

The operation of the apparatus in affixing tickets 24 to the tops of boxes will be first discussed. The normal condition of the units 50, 33, 38, and 59 is one in which their stems are retracted and, in the case of the units 55 and 57, their stems are extended. The carrier 40 is, accordingly, in its raised position and the carriage is in its second position above a box 19. A ticket 24 is held by the clamping arm 35 to the head 28 whose pressing members 39 are out of contact with the clamped ticket 24.

With the operation of the pneumatic system initiated as above described, air is delivered by the conduit 111 to the valve 114 of the "B" type and normally positioned to connect the conduits 111 and 115, the conduit 115 being in communication with the pilot of a valve 116 also of the "B" type. The valve 116 is normally positioned to connect the conduit 117 of the unit 50 to a manifold conduit P thereby to effect the retraction of its stem and to connect the conduit 118 of the unit 50 to relief. When air is delivered to the pilot of the valve 116, the valve 116 is positioned to shift the conduits 117 and 118 to effect the advance of the stem of the unit 50 thereby to lower the carrier 40 and press the head 28 and the ticket 24 clamped thereto against the top of the box.

The conduit 118 is connected to a control conduit 119 under the control of a valve 120 of the "B" type which is normally set to connect the conduit 119 to a conduit 121 in communication with the pilot of a valve 122 of the "B" type and to one pilot 123A of a valve 123 which is of the four way type having an oppositely acting pilot 123B.

In the normal position of the valve 122, the cylinder conduits 124 and 125 of the units 33 and 38, respectively, are connected to relief by a conduit 126 controlled by the valve 122 while the conduit 127 of the units 38 is connected thereby to a manifold conduit P to effect the retraction of the stems of the units 38. With air applied to its pilot, the valve 123 shifts to connect the cylinder conduit 127 to relief and connect the manifold conduit P to conduit 126 thereby operating the units 38 to bring their pressing members 39 into ticket-pressing position and to deliver air to the unit 33 through the conduit 124.

In the normal position of the valve 123, air is delivered by a manifold conduit P through a pressure regulator 128 to a conduit 129 connected through the valve 123 to the cylinder conduit 130 of the unit 33 to cause the retraction of its stem effecting the clamping position of the clamping arm 35.

When the pilot 123A of the valve 123 is subjected to operating air pressure it shifts the valve 123, the conduit 130 is connected to relief and the clamping arm 35 is moved into its ticket releasing position.

The conduit 126 also leads to a valve 131 of the "B" type which, in its normal position connects it to a conduit 132 in communication with the pilot of a valve 133 of the "B" type and also a loop 132A controlled by the valve 114 and maintained closed in the normal position thereof. In the normal position of the valve 133, it places a manifold conduit P in communication with the cylinder conduit 134 by which the unit 59 is operated to effect the retraction of its stem with its conduit 135 then connected to relief. When the valve 133 is operated by the application of air to its pilot, it is shifted with air now delivered through the conduit 135 and the conduit 134 connected to relief. The stem of the unit 59 is, accordingly, advanced to move the carriage into its third position in the application of tickets to the tops of boxes, the head is backed into a position free of the affixed ticket 24 so that the head may be raised without pulling the ticket with it.

The conduit 134 is also in communication with a control conduit 136 and the conduit 135 is in communication with a control conduit 137. One end of the control conduit 137 is in communication with and is controlled by a valve 138 of the "A" type and at its other end is controlled by the valve 120. In the normal position, the valve 120 connects the control conduit 137 to a control conduit 139. One end of the conduit 139 is in communication with the pilot of a valve 140 of the "A" type and air delivered thereto sets that valve to disconnect the conduit 141 from a manifold conduit P. The other end of the conduit 139 is controlled by the valve 131 and in the normal position thereof, it connects the conduit 139 to the control conduit 142 which includes a flow regulator 143, a delay reservoir 144 and the pilot of the valve 109 which is then set to connect the conduit 107 to relief which results in the valve 110 returning to its normal position in which it connects the conduit 111 to relief.

Before air in the conduit 111 and the conduit in communication therewith is exhausted, air is being delivered through the valve 138 which, in its normal position, connects the conduit 137 to a control conduit 145 having a check valve 146 which is then opened. The conduit 145 is in communication with the pilot of a valve 147 of the "C" type which is now set to connect a manifold conduit P to a conduit 148.

With the exhausting of the conduit 111, the valves 116, 122, 123, and 133 revert to their normal positions so that the carrier 40 is raised, the ticket-pressing members 37 are retracted and the unit 59 operated to return the carriage to its second position. The check valve 146 and the fact that the valve 147 is of the "C" type, prevent the return of the valve 147 to its normal position connecting the conduit 148 to relief. Air is now delivered through the operating conduit 134 and the control conduit 136 to a valve 149 of the "A" type which, in its normal position, connects the conduit 136 to a conduit 150 in communication with the pilot of the valve 151 which is thereby shifted to interconnect the conduits 148 and 152.

The conduit 152 is in communication with the pilot of the valve 153, a type "B" valve and the pilot of the valve 154 of the "A" type. The valve 154 normally connects the conduit 155 to a manifold conduit P. When the valve 153 is set by its pilot, the cylinder conduit 156 of the unit 57 is disconnected from the manifold conduit P and connected to relief and the cylinder conduit 157 is disconnected from relief and connected to that manifold conduit. The cylinder of the unit 57 then returns the carriage 40 to its first position with the head 28 at the station 29 to the dispenser 23. The cylinder of the unit 57 is provided with a cam 158 which, when the carriage is in its first position engages a cam 159 and actuating the valve 160, a three way valve normally closed by a spring, to connect a manifold conduit P to a conduit 161. The conduit 161 is in communication with the pilot 123B of the valve 123 to reset it to again interconnect the conduits 129 and 130 so that the stem of the unit 33 is now retracted and the clamping arm 35 clamps the ticket 24 at the station 29 to the head. The conduit 145 includes a loop 145A through the valve 123 that is connected to relief whenever the clamping arm 35 is operatively positioned thereby to permit the valve 147 to return to its normal position.

As the conduit 152 is now open to relief through the conduit 148, the valves 153 and 154 revert to their normal position with the shifting of the valve 153 reversing the flow of air through the conduits 155 and 156 and the unit 57 is now operated to return the carriage 40 to its second position to complete the cycle with another cycle initiated by the next box.

It should be noted, however, that when the carriage 40 is in its second and third position, the cylinder of the unit 57 engages and operates the valve 162 which is a type "B" valve, thereby connecting the manifold conduit P to a conduit 163. The conduit 163 is connected to the valve 112 and is thus operable to prevent a double signal in the middle of the cycle since the air therein is available to keep the switch 104 open.

When the tickets are to be applied to the sides of boxes, the position of the head 28 must be changed and the changed position requires that a different means be utilized to press the head 28 against the side of the box and a different means be employed to withdraw the ticket clamping arm 35 from engagement with the affixed ticket 24.

The fluid circuitry enables previously described means to carry out changed functions simply by setting the valve 27 into the appropriate position. When thus set air is delivered from a manifold conduit P to a conduit 164 delivering air to the pilot of a valve 165 of the "A" type and also to the pilots of valves 114, 120, 131, 138, and 149 and all these valves are thus shifted from their positions that were normal when the tickets were applied to box tops. As one consequence, the valve 114 now places the conduit 115 in communication with the conduit 141 so that the unit 50 is operated normally to maintain the carrier 40 in its lowered position.

The valve 165 now also connects the conduit 155 to a conduit 165A which is in communication with the pilot of a valve 166, a type "B" valve, which is now shifted to connect the cylinder conduit 167 of the unit 55 to a manifold conduit P and the cylinder conduit 168 to relief so that the stem of the unit 55 is normally extended in the second position of the carriage to position the head 28 for applying tickets 24 to the sides of boxes.

The arrival of a box initiates a ticket transferring and affixing cycle in the manner previously described but air delivered by the conduit 111 is now connected by the valve 114 to the conduit 132 which sets the valve 133 to deliver air to the unit 59 to cause its stem to advance thus advancing the head 28 to press a ticket against the side of the box, the new function of that unit.

The valve 131, as now positioned blocks air flow from the conduit 132 and air is delivered to the conduit 137 from the conduit 135 and the valve 138 as now set constitutes a dead end for the conduit 137 with the valve 120 at the other end thereof connecting the conduit 137 to the conduit 121 and the units 33 and 38 are, accordingly, operated in the previously described manner.

As the valve 131 has been set by its pilot, the conduit 126 is now connected to the conduit 139 which is in communication with the pilot of the valve 140 which is shifted to connect the conduit 141 to relief thus permitting the valve 116 to return to its normal position in which the unit 50 is operated to raise the carrier 40 and hence raise the clamping arm 35 out of contact with an affixed ticket 24 so that the carriage can be returned to its first position without pulling the ticket from the box.

The conduit 142 is also connected to the conduit 126 when the valve 131 is shifted by its pilot resulting, as previously detailed, in the valve 109 being connected to relief so that the valve 110 shifts to disconnect the conduit 111 from its manifold conduit P so that air may now be exhausted therefrom.

The operating conduit 117 for the unit 50 is connected to a conduit 169 placed in communication with the conduit 145 by the valve 138 when set by its pilot so that the unit 57 is operated in the manner previously described to return the carriage to its first position.

The valve 120, when set by its pilot, also connects the conduit 119 to a conduit 170 in communication with the pilot of the valve 171 and sets it to connect manifold conduit P to conduit 172. As the valve 149 has been set by its pilot, the conduits 172 and 150 are interconnected to effect the operation of the valve 151 to admit air under pressure to the conduit 152 to operate the unit 57 in the previously described manner. It will be noted, however, that when air is delivered to the pilot of the valve 153 with the resulting return of the carriage 52 to its first position, air is also delivered to the pilot of the valve 154 which now shifts to connect the conduit 165A to relief through the conduit 155. The valve 166 shifts back to its normal position with the result that the unit 55 is operated to place the head 28 in its other position in which it may pick up another ticket 24 at the station 29.

In practice, the apparatus is provided with operator controls such as shown in FIG. 10 in which the connection 173 from the air source to the manifold M is provided with a normally closed valve 174 of the "C" type. A branch conduit 175 includes a normally closed manually operated valve 176 of the pushbutton type and is in communication with the pilot of the valve 174 and with parallel, normally closed manually operated valves 177 also of the pushbutton type, one on each side of the apparatus enabling emergency stops to be made as, once either one is operated, the pilot of the valve 174 is relieved of pressure and that valve closes.

Reference is now made to FIG. 14 in which a suction pick-up 178 is used in place of the unit 33 and its clamping arm 35. The suction pick-up is shown as the intake of a conduit 130C connected to a suction source V by the control valve 123C which is or may be identical with the valve 123 and operated in the same manner. The operating circuitry may otherwise be the same as that schematically shown in FIG. 9 except that the conduit 124 is no longer necessary as the ticket release occurs when the valve 123C connects the conduit 130C to relief.

From the foregoing, it will be appreciated that apparatus in accordance with the invention is well adapted to meet the requirements of ticket applications to a selected one of two angularly disposed surfaces. While the apparatus has been discussed primarily in connection with inventory tickets, it can be used with various other articles and in affixing them to objects other than boxes. While the operating means has been shown as a pneumatic system, electrical systems can be used where such factors as costs or rates of operation are not important.

I claim:

1. Apparatus for picking up an article at a station to which said articles are successively delivered and for transferring and affixing that article to a surface of an object in a predetermined position, each article having adhesive on its undersurface in condition for use, said apparatus comprising a head including means operable in the alternative to pick up and hold one article or to release it, means in support of said head and reciprocable between a position in which the pick-up means is at the station and a position in which the held article is seated against said surface, means carried by said head and movable between an inoperative position and a position in pressing contact with the held article, and means operable in response to the presence of an object in said position to effect, through a complete cycle, pick-up of an article at the station, the seating of the article against the surface and its release with said article-pressing means in pressing contact with said article during the release of said article.

2. The apparatus of claim 1 in which the apparatus includes an arm overlying the predetermined position of the object and the head supporting means includes a carrier supported by said arm lengthwise thereof for movement between raised and lowered positions and a carriage supported by such carrier for movement along it between first, second, and third positions, and the operating means is operable to raise and lower the carrier and to move said carriage from position to position, the head in the first position placing the pick-up means at the station and in the second position of the carriage being closely adjacent the surface.

3. The apparatus of claim 2 in which, in the lowered position of the carrier, the article is seated against the surface.

4. The apparatus of claim 2 in which, in the third position of the carriage, the article is seated against the surface.

5. The apparatus of claim 2 in which, at the start of a cycle, the carriage is in the second position.

6. The apparatus of claim 2 in which the head has a backing portion and the pick-up means includes a clamping arm movable into and out of clamping engagement with said backing portion and the clamping arm is backed away from engagement with the affixed article by movement of the carriage into its third position.

7. The apparatus of claim 2 in which the head has a backing portion and the pick-up means includes a clamping arm movable into and out of clamping engagement with said backing portion and the clamping arm is backed away from engagement with the affixed article by the raising of the carrier.

8. The apparatus of claim 2 in which the apparatus is for use in the application of articles to either a vertical surface or a horizontal surface and the means in support of the head includes an arm connected thereto to swing through an arc of 90° thus establishing first and second head positions, in the first position the article being held in the plane of an article at the station and means including a control, operable to set the arm to provide for head engagement with the desired surface, in the case of the second head position, said means shifting said head into and out of its first position as the carrier returns to and departs from its first position.

9. The apparatus of claim 1 in which the pick-up means is a member having an article-engaging face provided with a cavity and the apparatus includes suction creating means in communication with the cavity.

10. The apparatus of claim 1 in which the pressing means includes at least one piston-cylinder unit provided with a pressing member.

11. The apparatus of claim 1 in which the pick-up means is engageable with the central portion of an article and the pressing means includes two pressing members, one for each end of the article and engageable therewith.

12. Apparatus for picking up an article at a station to which said articles are successively delivered and for transferring and affixing that article to a surface of an object in a predetermined position, each article having adhesive on its undersurface in condition for use, said apparatus comprising an arm overlying the predetermined position, a carrier supported by the arm for movement between raised and lowered positions and extending lengthwise of said arm, first means carried by said arm operable to raise and lower said carrier, a carriage supported by said carrier and movable between first, second and third positions therealong, the first position being adjacent said station, second means supported by said carrier and operable to reciprocate the carriage between its first and second positions, third means supported by said carrier and operable to reciprocate said carriage between its second and third positions, a head below said carriage and supported thereby, said head including fourth means operable in the alternative to pick up and release an article and fourth means to operate said pick-up means, and means in control of said operating means to provide a cycle during which the fourth means picks up an article, the second means moves the carriage to place the head closely adjacent the surface, and one of the other two operating means places the article against the surface depending on whther the surface is in one plane or in a plane disposed at an angle relative thereto, and in which the head includes at least one article pressing member and fifth means operable to move said pressing member into and out of engagement with a held article and the control means effects the article pressing engagement of the member with the article as the article is placed against the surface.

13. The apparatus of claim 12 in which the second and third means are fluid pressure operated, double-acting, piston-cylinder units, the cylinder of the second unit attached to the carriage, the cylinder of the third unit attached to the carrier, and the stems of the two units interconnected.

14. Apparatus for picking up an article at a station to which said articles are successively delivered and for transferring and affixing that article to a surface of an object in a predetermined position, said surface being an upper surface or a side surface, each article having adhesive on its undersurface in condition for use, said apparatus comprising a head including means operable in the alternative to pick up and hold or release an article, means in support of said head and operable to effect three laterally spaced positions thereof, the first at the station, the second adjacent the surface, and the third with the article seated against said surface by the head in the case of side surface applications, and a fourth in which the head is lowered to seat the article against the surface in the case of upper surface applications, said head also including means movable into and out of an article-pressing position, means carried by the supporting means and operable to shift the head into a position for article seating engagement with either surface, and control means operable in response to the presence of an object in said position to effect, through a complete cycle and starting with the head adjacent the surface, the positioning of the article against the surface, the release of the article with the pressing means in contact therewith, the return of the head to the station, the operation of the pick-up means to pick up another article, and the return of the head to its starting position.

15. The apparatus of claim 14 in which the supporting means includes a first unit operable to reciprocate the head between its first and second positions, a second unit operable to reciprocate said head between its second and third positions, a third unit operable to reciprocate the head into and out of its lowered position, and the head includes a fourth unit operable to reciprocate said article-pressing means into and out of contact with the article.

16. The apparatus of claim 15 in which the units are double-acting, air operated, piston-cylinder units and each includes means to deliver air to and exhaust air from either side of its piston and including a valve of the type having a pilot operable to shift it from a first to a second position against the action of a spring, the apparatus also including means to operate the pick-up means, and the control means includes conduits in communication with the pilots and operable to deliver air thereto and to control the pick-up operating means in cycle-establishing order and including a valve opened in response to the presence of an object in said predetermined position, and a control conduit including means to close said valve at the end of each cycle.

17. The apparatus of claim 16 in which the means operating said pick-up include an air conduit, a valve in control thereof having first and second pilots to establish its first and second positions, and the control conduits include a first control conduit including said normally closed valve and delivering, when opened, air to the pilot of the valve of the third unit to set it to lower the head, a second control conduit in communication with the delivery means of the third unit in the second position of its valve and the pilot of the fourth unit valve to set in its second position to render the pressing means operative and also in communication with the first pilot of the pick-up control and setting it to effect article release, a third control conduit in communication with the delivery means of the fourth unit in the second position of its valve and the second unit valve to set it to render the second unit operative to move the head into its third position, a fourth control conduit in communication with the air delivery means of the second unit in the second position of its valve and including at one end said means to close the valve of the first control conduit, the valves of the second, third, and fourth units then returning to their first position with the head raised and in its second position and the pressing means inoperative, a fifth control conduit including a check valve and in communication with the other end of the fourth control conduit and including a loop, opened to relief by the pick up control when in its first position, a sixth control conduit in communication with the pilot of the valve of the air delivery means of the first unit including first and second valves each of a type having a pilot operable to shift it from a first to a second position against the action of a spring, the sixth conduit being closed in the first position of the first and second valves and the first unit, the fifth control conduit being in communication with the pilot of the first valve, a seventh control conduit in communication with the pilot of the second valve and the delivery means of the second unit when its valve has shifted back to its first position in which the head is in its second position, an eighth control conduit including a normally closed valve and in communication with said second pilot of the pick-up control valve to set it in its first position, the pick-up means then operative to pick up an article, and means movable with the second unit to actuate said eighth conduit valve to open the eighth conduit when the head is in its first position.

18. The apparatus of claim 17 in which the pick-up means is a suction head.

19. The apparatus of claim 17 in which the pick-up means includes a clamping jaw and the operating means therefor includes a fifth double-acting, air-operated, piston-cylinder unit and means to deliver air to and exhaust air from either side of its piston, the means delivering air to and exhausting air from one side of the piston including said valve having first and second pilots and the means delivering air to and exhausting air from the other side of the piston including the air delivery and exhaust means of the fourth unit that are employed to position the pressing means operatively.

20. The apparatus of claim 19 in which the head shifting means includes a sixth double-acting, air operated, piston-cylinder unit, means to deliver air to and exhaust air from either side of its piston, and a valve of the type having a pilot operable to shift it from a first to a second position against the action of a spring, in the first position, the head being positioned for upper surface applications, a ninth control conduit including a manually operable valve which when open connects the ninth circuit to the pilot of the sixth unit valve to set it in its second position, the sixth unit then shifting the head for side applications, a series of valves each of the type having a pilot operable to shift it from a first position to a second position against the action of a spring, the first positions of the valves of said series providing the operation of the control means for upper surface applications, said ninth conduit being in communication with the pilots of the valves of said series to effect the second position thereof, a tenth control conduit, one series valve then connecting the tenth control conduit to a portion of the first control conduit thereby to set the third unit valve to effect the lowered head position and to connect the portion of the first control conduit controlled by the normally closed valve to the portion of the third control conduit in communication with the pilot of the second unit valve to effect the seating of the head against the surface, another valve of said series then interconnecting the fourth control conduit and the portion of the second control conduit in communication with the fourth unit valve and the first pilot of the pick-up control valve thereby to effect the release of an article and the placing of the pressing means in engagement therewith, another of said series valves when interconnecting the fourth control conduit and the fifth control conduit and also placing said fourth control conduit in communication with the pilot valve of the tenth control conduit and operable to open it thereby to effect the return of the second, third, and fourth units to position in which the head is raised and returned to its second position and the pressing means rendered inoperative and the article pick-up means set to pick up an article, an eleventh control conduit in communication with the delivery means of the third unit in the second position of its valve and including another of the valves of said series and interconnecting its second position the eleventh and sixth conduits, a twelfth control conduit including another valve of said series and a delivery valve, and a thirteenth control conduit including a valve having a pilot by which it may be moved against the action of a spring from a first to a second position, said thirteenth valve then being in communication with that part of the seventh conduit in communication with the pilot of the second valve of the sixth control conduit, said thirteenth and fourth conduits being interconnected by the second named valve of said series, the head then being moved into its first position.

21. The apparatus of claim 17, the means initiating a cycle include an electric circuit including a normally open switch closed by an object in said predetermined position, a control conduit including a normally closed valve, a solenoid operable to open said normally closed valve and included in said circuit, said control conduit including a branch operable to open said switch and including a check valve, a normally closed valve, and the pilot of the first control conduit valve.

22. The apparatus of claim 21 and a control conduit in communication with said check valve and including a normally closed valve including an actuator engaged by the first unit when the carriage is in its second position.

23. The apparatus of claim 17 in which the means closing the first control conduit valve includes a valve having a pilot operable to shift the valve from a first position into a second operative position, and the fourth control conduit is in communication with the pilot thereof, said fourth control conduit including means to retard the flow of air to the pilot of the valve of the valve closing means.

24. The apparatus of claim 17 in which the means operable in response to an object in a predetermined position include a switch closed by that object, an air delivery valve including a solenoid energized when said switch is closed, a fourteenth control conduit including a normally closed valve adapted to be opened by air delivered through the fourth conduit, and said normally closed valve of the first control conduit including a piston operable to open it, the fourteenth conduit being in communication with said last named pilot.

25. The apparatus of claim 24 in which the switch includes air-operated means to open it and the fourteenth conduit is in communication therewith.

References Cited

UNITED STATES PATENTS

| | | | |
|---|---|---|---|
| 2,712,393 | 7/1955 | Brown | 156—572 |
| 1,578,822 | 3/1926 | Glover | 271—11 |
| 3,685,245 | 8/1972 | Frost | 53—14 |
| 3,243,329 | 3/1966 | Anderegg | 156—351 |
| 2,520,628 | 8/1950 | Elsner | 156—571 |
| 2,328,516 | 8/1943 | Von Hofe | 156—572 |
| 3,264,161 | 8/1966 | Stremke, Jr. | 156—360 |

DOUGLAS J. DRUMMOND, Primary Examiner

M. G. WITYSHYN, Assistant Examiner

U.S. Cl. X.R.

156—572